April 7, 1925.
J. GRAVES ET AL
1,532,401
GELATINIZING MACHINE FOR BATTERY ELECTROLYTES
Filed Oct. 10, 1921     5 Sheets-Sheet 1
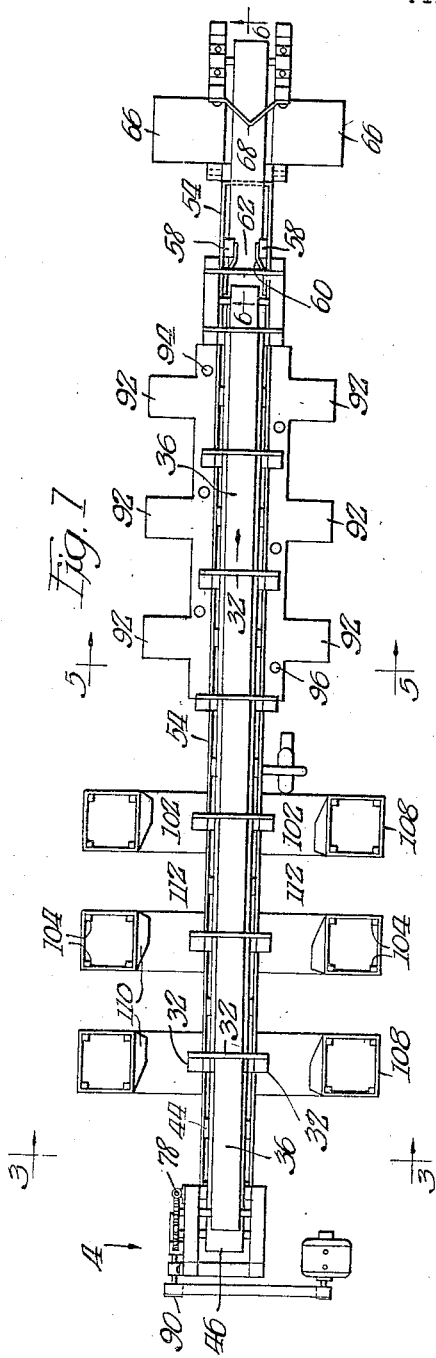
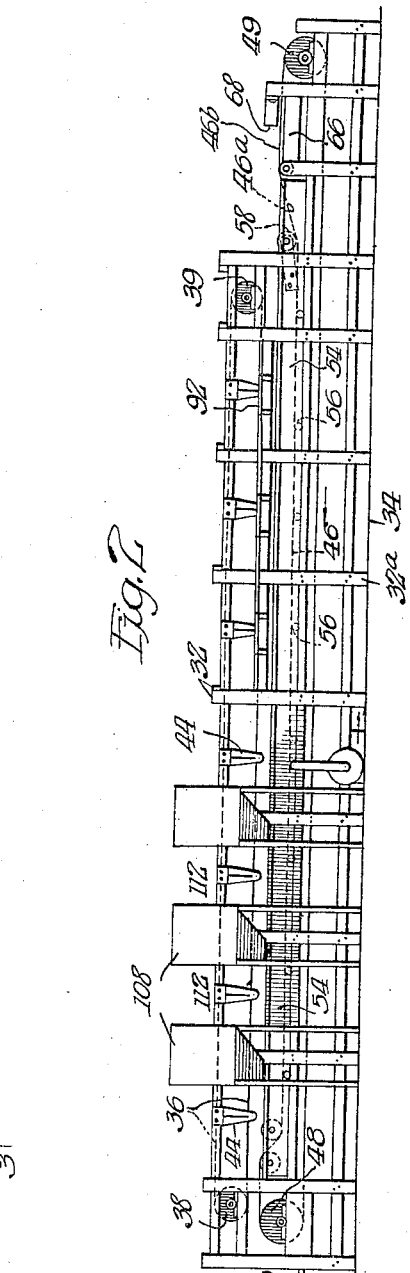
Inventors
John Graves,
William Balderston,
Edgar J. McEachron,
By Cheever & Cox
attys

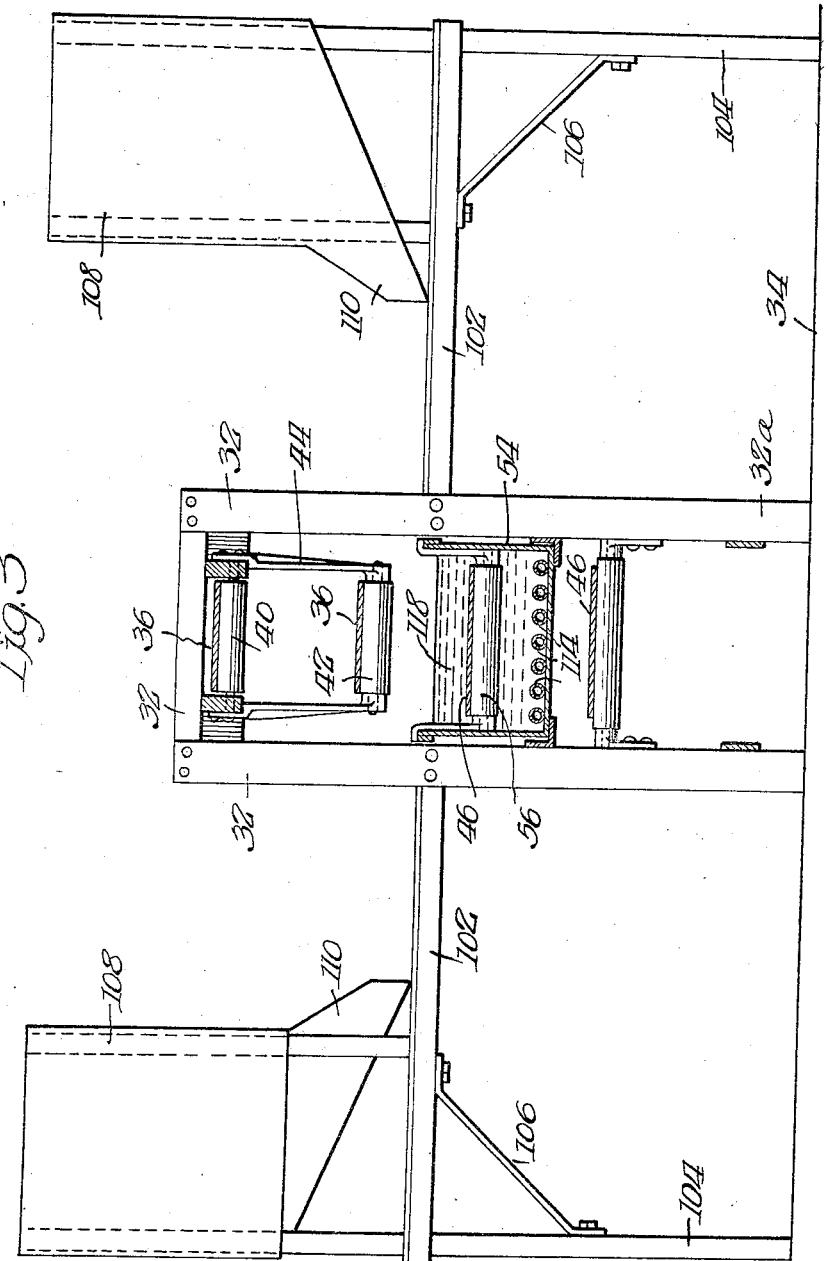

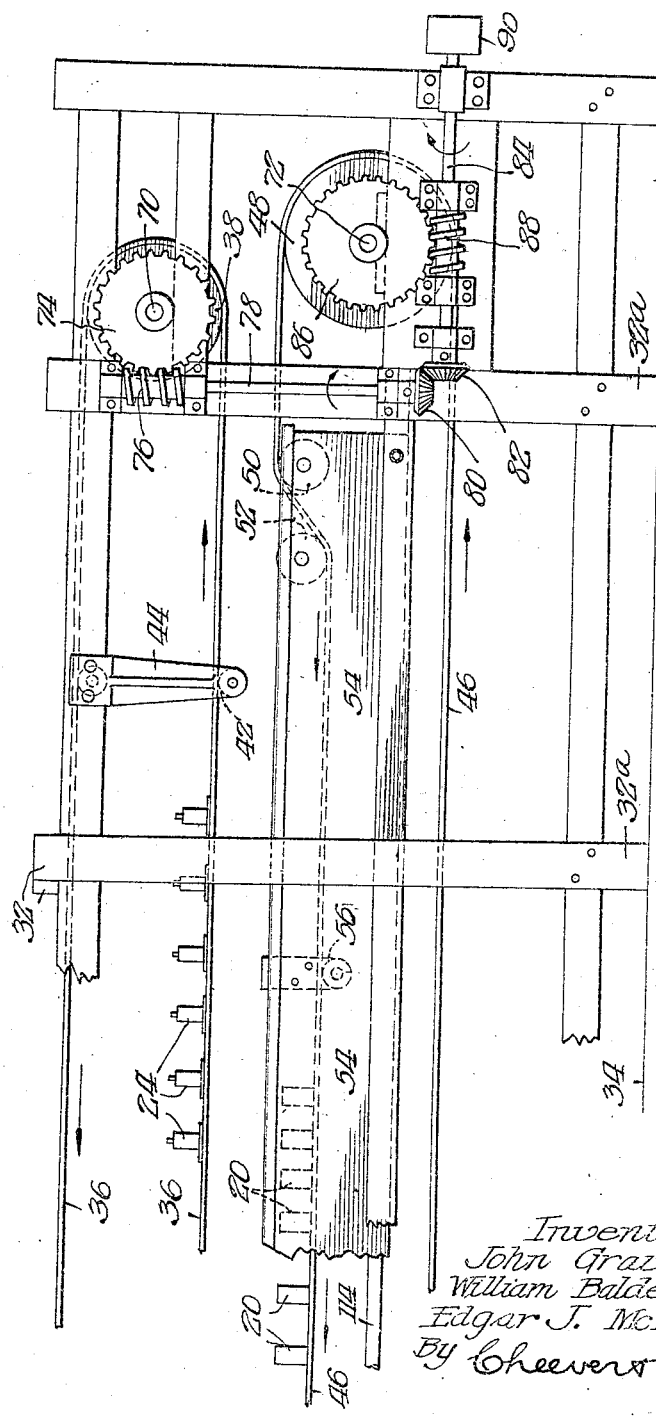

April 7, 1925.
J. GRAVES ET AL
1,532,401
GELATINIZING MACHINE FOR BATTERY ELECTROLYTES
Filed Oct. 10, 1921    5 Sheets-Sheet 4
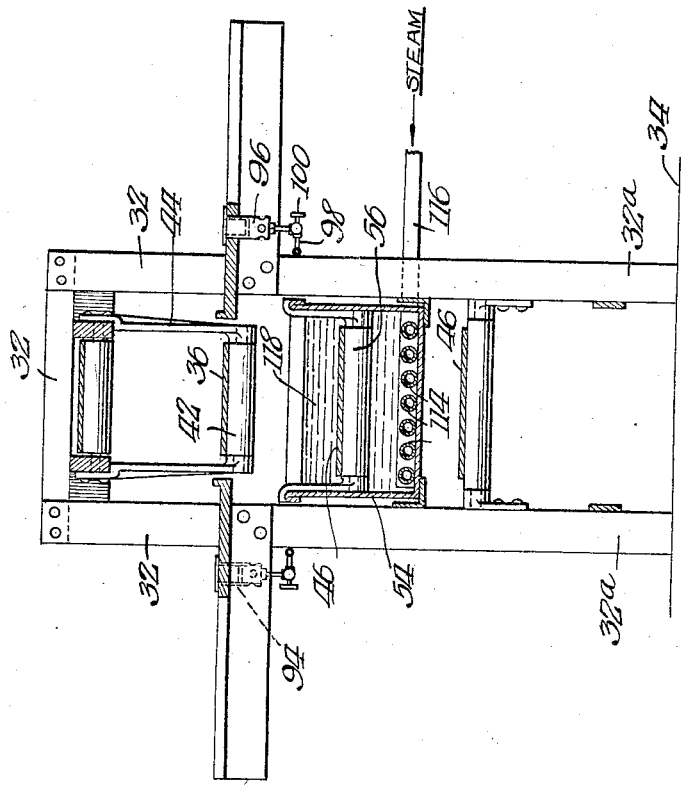
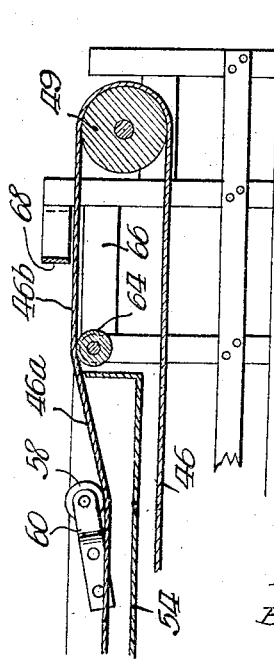
Inventors:
John Graves
William Balderston
Edgar J. McEachron,
By Cheever & Cox
Attys.

April 7, 1925. 1,532,401
J. GRAVES ET AL
GELATINIZING MACHINE FOR BATTERY ELECTROLYTES
Filed Oct. 10, 1921 5 Sheets-Sheet 5
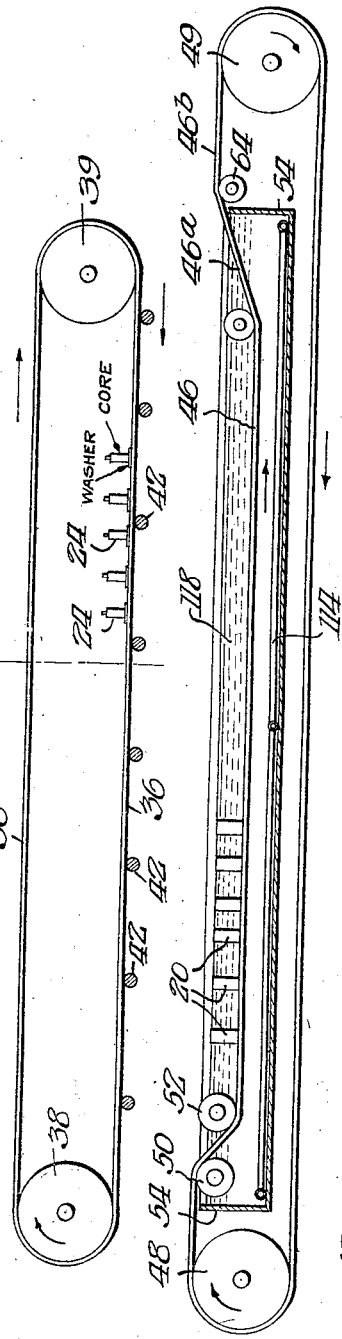
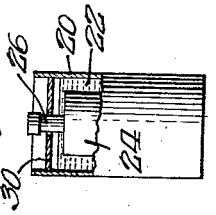
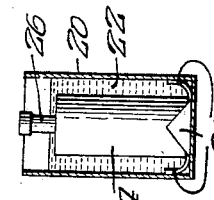
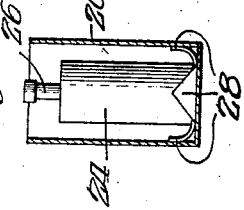
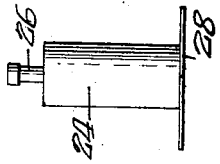
Inventors:
John Graves,
William Balderston
Edgar J. McEachron,
By Cheever & Cox
Attys.

1,532,401

Patented Apr. 7, 1925.

UNITED STATES PATENT OFFICE.

JOHN GRAVES, WILLIAM BALDERSTON, AND EDGAR J. McEACHRON, OF MADISON, WISCONSIN, ASSIGNORS TO FRENCH BATTERY & CARBON COMPANY, OF MADISON, WISCONSIN, A CORPORATION OF WISCONSIN.

GELATINIZING MACHINE FOR BATTERY ELECTROLYTES.

Application filed October 10, 1921. Serial No. 506,913.

*To all whom it may concern:*

Be it known that we, JOHN GRAVES, WILLIAM BALDERSTON, and EDGAR J. McEACHRON, citizens of the United States, residing at Madison, in the county of Dane and State of Wisconsin, have invented a certain new and useful Improvement in Gelatinizing Machines for Battery Electrolytes, of which the following is a specification.

The object of this invention is to provide a machine in which it is possible to produce electric dry batteries with unwrapped cores by the gelatinization method, rapidly uniformly and cheaply; thereby greatly reducing the cost of manufacture and consequently the price to the user.

The invention consists in such a machine, operatable by a large group of operators, so arranged that a very small floor space is required to accommodate the numerous operators while the materials worked upon only have to travel comparatively short distances thereby promoting efficiency. The invention further consists in a machine having the foregoing advantages which is efficient easily and cheaply made, which is not readily liable to get out of order and still more particularly in features and details of construction which will be hereafter more fully set forth in the specification and claim.

Referring to the drawings in which like numerals designate the same parts thruout the several views, Figure 1 is a plan and Figure 2 a side view of one form of mechanism illustrating this invention in its preferred form.

Figure 3 is a sectional end view considerably enlarged taken on the line 3—3 of Fig. 1.

Figure 4 is a rear view of the left hand portion of Fig. 1 taken in the direction of the arrow 4 of Fig. 1 showing particularly the driving mechanism.

Figure 5 is an enlarged sectional end view on the line 5—5 of Fig. 1.

Figure 6 is an end elevation of the right hand end of the machine taken on the lines 6—6 of Fig. 1.

Figure 7 is a diagrammatic view showing the method of actually manufacturing the batteries.

Figures 8, 9, 10 and 11 are views of parts of the batteries to be made by the aid of the machine showing successive operative steps.

In these last four figures 20 represents the usual can of a dry cell; 22 is a suitable electrolyte which gelatinizes or assumes a thick pasty consistency during the manufacture of the battery; 24 is a core of depolarizing material having embedded therein a carbon electrode 26 whose upper end projects above the upper end of the core; 28 is a separator member in the form of a disc of rather stiff flexible paraffin paper secured to the lower end of the core paper by means of a suitable adhesive; 30 is a centering washer in the upper end of the device. In making this battery a separator 28 is first stuck to the bottom of the core 24 and placed in can 20 (Fig. 9), the electrolyte 22 is poured in (Fig. 10) and the washer 22 is positioned (Fig. 11). Then the electrolyte is gelantinized by introducing the cell of Fig. 11 into water of a temperature of about 80 C. for a very short time. For successful operation it is essential that the gelatinization take place very promptly after the introduction of the electrolyte into the cell.

The machine by which these operations may be promptly and efficiently performed on large quantities of batteries in a compact floor space will now be described.

Extending at intervals along the central axis of the machine as shown in Fig. 1 are a plurality of rectangular upright frame members 32 having lower ends or feet 32ª resting on the floor 34 or the like. Some eight of these frames are shown, but any convenient number may be provided as required. In the upper portion of the frame is located a dry horizontally movable conveyer belt 36 traveling over suitably disposed end pulleys 39, at the receiving end of this belt, and 38, at its delivery end, and intermediate supporting rollers 40 and 42 for the lower or operating side of the belt. The rollers 42 supporting the lower or operating portion of the belt 36 are suitably journaled in hangers 44 suspended from the upper portion of the frame as shown in Fig. 3.

Mounted in the upright frame members below the belt 36 and generally parallel thereto is what will be for convenience referred to as a wet belt 46 carried on driven pulley 48 at the receiving end of the belt and pulley 49 at the delivery end. The upper or operating side of wet belt 46 is, near its receiving end, passed over guiding rollers 50 and 52 suitably mounted to cause the belt to duck down into and travel thru a hot water tank 54 suitably supported in the upright frames 32 between the upper and lower portion of belt 46. The operating part of the belt is, in traveling thru the tank 54, kept in approximately horizontal position by a plurality of sustaining rollers 56 (Fig. 2) which extend entirely across the belt at intervals along the tank. At the delivery end the belt is still held down in the tank by short shaft rollers 58 mounted on suitable side brackets 60 so arranged that the clear space 62 is left between them as shown in Fig. 1 so that a battery 20 on the belt in the tank is carried up to portion 46ᵃ of the belt 46 at the right hand end thereof as shown in Fig. 7 to a point outside the tank beyond the supporting roller 64 until it becomes portion 46ᵇ of the belt adjacent to the side tables 66 onto which the cans can be conveniently removed to delivery tables 66. Preferably but not necessarily the finished batteries are switched off from the belt portion 46ᵇ at this point by a suitable switching device 68 which, in the particular case here illustrated, takes the form of an angular guiding members secured in place as shown in Fig. 1.

Power mechanism is provided for causing the operative portions of belts 36 and 46 to travel in opposite directions at about the same speed. In the particular case here illustrated this result is accomplished by going to the opposite end of the machine from table 66 and there providing the shaft 70 upon which the adjacent pulley 38 is carried and the shaft 72 on which the adjacent pulley 48 is carried with suitable gears driven from a suitable source of power. In the particular case here illustrated shaft 70 carries a worm gear 74 meshing with a worm 76 on vertical shaft 78 suitably mounted on the frame of the machine there being on the lower end of this shaft 78 a bevel gear 80 meshing with a corresponding bevel gear 82 on a horizontal shaft 84 conveniently located adjacent to shaft 72 so that the gear 86 on the latter shaft will mesh with a worm 88 on shaft 84. Power is applied to the gear and shaft mechanism described at any convenient point as for instance the pulley 90 on shaft 84. When power is so applied the gears 86 and 74 rotate at approximately the same speed depending on the ratio of the gears 80 and 82 or other gear mechanism in the device with the result that the two belts 36 and 46 travel as described.

Suitably mounted on opposite sides of belt 36 at its receiving end (right half of Figure 1) are a plurality of separated operators' station tables 92 each equipped with a suitably heated paste pot 94 by the use of which operators at these stations are enabled to stick the cores 24 to the separator members 28 and thus assemble the parts of the battery as far as is shown in Fig. 8. The tables are so located that on completing such operation the particular operator can put the finished product onto the lower or operating half of belt 36 as diagrammatically illustrated in Fig. 7 and elsewhere.

The mechanism for heating the paste pots 94 is in detail immaterial. It may take the form of the use of Bunsen burner 96 supplied with gas thru pipe 98 controlled by hand valves 100, the gas being supplied to the burner by any suitable conventional source.

Conveniently located on opposite sides of the machine and in the left hand half thereof in Figure 1 adjacent to the receiving end of belt 46 are a plurality of separated operators' tables 102 preferably located as shown in the drawing on the level of the top of the tank 54. These tables 102 are considerably stronger than tables 92 and have their outer ends supported by suitable legs 104 braced at 106 as shown so as to conveniently support upstanding can bins 108 adapted to deliver empty cans 20 thru downwardly inclined chutes 110 onto the table 102 in convenient position so that an operator standing in the space 112 provided for him between the tables 102 can readily take a can from the table, place a core 24 delivered by the belt 36 therein pour in the liquid 22 (from a source not shown) and after positioning washer 30 put the completely assembled battery onto the receiving portion of belt 46 in tank 54 in the position shown in the left hand half of Fig. 7. If desired two operators standing on opposite sides of the table 102, one of them principal and the other assistant, may perform different parts of the operation by putting the core into the can and putting the can into the tank.

Along the bottom of tank 54 is a steam coil 114 or other suitable heating mechanism conventionally heated in the particular case here illustrated with steam through pipe 116. The heat given out by this steam coil or other heating mechanism keeps the water 118 in the tank sufficiently warm so that before the finished batteries travel through the tank they are properly gelatinized.

When the finished battery has reached the table 66 it may be removed by an operator located at this point.

Owing to the fact that the battery core 26 and separator 28 have to be secured together by paste or some other method involving the use of the dry equipment and that the can heating is obviously a wet operation and the belt 46 never has a chance to dry, it is necessary to have two separate belts. In this machine these two separate belts are mounted to do the necessary carrying in a minimum floor space, the operators are all conveniently arranged so that they can work efficiently and be conveniently supervised and directed when so doing. In actual practice a machine having ten operator stations on each half of the belt device and two operators at table 66 has handled sixty thousand cells as last described in ten hours, an impossibility otherwise.

Having thus described our invention what we claim as new and desire to secure by Letters Patent is:

A machine for facilitating the assembly of electric cells having a gelatinous electrolyte, comprising a pair of superimposed conveyor belts, means for driving said belts in opposite directions, a heating medium through which the upper reach of the lower belt is arranged to travel, a group of operator stations near one end of the machine where the cells are partially assembled and placed on the lower reach of the upper belt to be conveyed to the other end of the machine, said operator stations including tables disposed substantially at the level of the lower reach of the upper belt to facilitate transfer of the partially assembled cells to said lower reach, and another group of operator stations near the opposite end of the machine where the partially assembled cells are removed from the lower reach of the upper belt, completely assembled and placed on the upper reach of the lower belt to be conveyed through said heating medium, said last mentioned operator stations including tables disposed substantially at the level of the upper reach of the lower belt.

In witness whereof we have hereunto subscribed our names.

JOHN GRAVES.
WILLIAM BALDERSTON.
EDGAR J. McEACHRON.